219-121.	SR
6-26-73	OR	3,742,182

United States Patent [19]
Saunders
[11] 3,742,182
[45] June 26, 1973

[54] METHOD FOR SCANNING MASK FORMING HOLER WITH A LASER BEAM

[75] Inventor: Richard J. Saunders, Milpitas, Calif.
[73] Assignee: Coherent Radiation, Palo Alto, Calif.

[22] Filed: Dec. 27, 1971
[21] Appl. No.: 211,912

[52] U.S. Cl. .............. 219/121 LM, 156/155, 264/25
[51] Int. Cl. .............. B23k 27/00
[58] Field of Search .............. 219/121 L, 121 EB, 219/68, 384; 264/22, 25, 67; 156/155

[56] References Cited

UNITED STATES PATENTS

| | | | |
|---|---|---|---|
| 3,597,578 | 8/1971 | Sullivan et al. | 219/121 L |
| 3,266,393 | 8/1966 | Chitayat | 219/121 L |
| 3,236,707 | 2/1966 | Lins | 219/121 LM |
| 3,549,733 | 12/1970 | Caddell | 219/121 LM |
| 3,440,388 | 4/1969 | Otstot et al. | 219/121 LM |
| 3,543,979 | 12/1970 | Grove | 219/121 L |

OTHER PUBLICATIONS

"Carbon Dioxide Applications" Technical Disclosure Bulletin of Coherent Radiation Laboratories 9/1969.

"Lasers in Industry" IEEE Proceedings 2/1969 pp. 114–129.

IBM Technical Disclosure Bulletin Vol. 8 No. 3 8/65 pp. 434.

IBM Technical Disclosure Bulletin Vol. 10 No. 1 6/67 pp. 63.

IBM Technical Disclosure Bulletin Vol. 12 No. 12 5/70 pp. 2272.

*Primary Examiner*—J. V. Truhe
*Assistant Examiner*—George A. Montanye
*Attorney*—Karl A. Limbach, Gerald P. Parsons et al.

[57] ABSTRACT

A technique of constructing a plurality of holes in sheet material by scanning a coherent laser beam across holes in a mask overlaying said material. The use of a stream of gas coaxially aligned with said coherent light beam is also disclosed. A special technique is included for making one or more holes in a non-homogeneous particulate sheet material having finely divided particles held together by a binder, such as green (unbaked) ceramic, with the use of a coaxial coherent light beam and gas pressure stream.

8 Claims, 7 Drawing Figures

INVENTOR.
RICHARD J. SANDERS
BY
Limbach, Limbach & Sutton
ATTORNEYS

INVENTOR.
RICHARD J. SAUNDERS
BY
Limbach, Limbach & Sutton
ATTORNEYS

METHOD FOR SCANNING MASK FORMING HOLER WITH A LASER BEAM

BACKGROUND OF THE INVENTION

This invention relates generally to the art of forming holes in material by the use of coherent light energy from a laser.

The technique of punching holes in a sheet material by the use of a coherent light beam from a laser relies on vaporization of an area of the sheet material upon which the light beam is incident. An application of this punching technique is given in U.S. Pat. No. 3,226,527. The principle underlying the application described therein and others is that the laser beam is directed against an area of the sheet material for a length of time sufficient for enough energy to be absorbed by the sheet material to cause its vaporization and thus the forming of a hole.

Others have suggested additionally the use of a gas jet directed against an area of material illuminated with a coherent light beam and at a finite angle with the light beam. Such a gas jet serves to remove dirt and debris developed by the vaporization of sheet material. The gas utilized is usually inert, but it may also be oxygen or some other gas that aids in the cutting operation by a chemical reaction with the material being drilled.

An application suggested for use of the laser hole forming technique is with ceramic insulating sheet material that is presently being utilized to construct high density, low-cost, self-contained electronic circuits that are sealed between ceramic layers. The various layers of electronic circuits are connected to each other through holes in the ceramic sheet material. The ceramic is a dielectric material. Since fired (baked) ceramic is very difficult to perforate, ceramic sheets are presently being mechanically punched while green (unbaked). The circuit is assembled with several layers of punched green ceramic and the resulting module is then fired (baked) at a single time. It is desired that these modules be very small and thus the holes through the ceramic layers must also be very small, preferably in the neighborhood of a few thousandths of an inch in diameter.

The technique of mechanically punching the green ceramic has certain disadvantages. It is very difficult, for instance, to make the punching pins as small as would be desired and still maintain mechanical rigidity to prevent their breakage. It is very difficult to make a mechanical punching pin smaller than 0.010 inch in diameter without going to a great expense and exercising a great deal of care during the punching operation.

Therefore, it is a principle object of the present invention to provide an improved technique for punching a plurality of very small holes in green ceramic sheet material.

It is another object of the present invention to provide various improvements in the general technique of punching small holes in sheets of material by laser light beams.

It is also an object of the present invention to provide a technique for drilling holes in sheet material that are larger in diameter than the diameter of the laser beam utilized.

SUMMARY OF THE INVENTION

A green ceramic material is a non-homogenous type having finely divided particles held together by a binder. It has been found according to one aspect of the present invention, that such non-homogenous materials including, but not limited to, green ceramic have a smaller and cleaner cut therein with the use of a coherent light beam from a laser when a gas stream is oriented coaxially with the coherent light beam for simultaneous impingement against the non-homogenous sheet material. The energy density of the coherent light beam and the time of exposure for construction of any one hole in the sheet material is controlled so that the binding material therein is vaporized by the coherent light energy, but all of the particulate material along the path of the beam through the sheet is not vaporized. This is contrary to other techniques in which all of the material in the area of the hole is vaporized.

However, according to the technique of the present invention, the coherent light energy serves a primary function of vaporizing the material binding the finely divided particles together, and the gas stream incident upon the sheet coaxially with the light beam then blows the particles through the sheet and out of its opposite side from which the coherent light beam and air stream are incident. This technique has the advantage that less coherent light radiation need be absorbed by the material to result in a hole and thus the possibility is reduced that areas of the material surrounding the desired hole will inadvertently be vaporized. Aiding in this is the coaxial gas stream which helps cool the edges of the hole being formed. The gas stream preferably strikes an area of the sheet material which includes an area greater than that of the hole being formed.

The coaxial gas jet utilized according to this aspect of the present invention also has the advantages of other types of gas streams that have been previously used by others. A focusing lens which is necessary as part of the coherent light beam-forming apparatus is protected since the gas stream blows contaminates away and through the mask. The gas utilized may be simply air under pressure or some other gas that does not chemically react with sheet material composition during formation of a hole therein. Clean holes having a diameter of only 0.005 inch may be formed by this technique in sheets of non-homogenous material having finely divided particles held together by a binder.

According to another aspect of the present invention, a plurality of holes are constructed in a sheet material according to a predetermined pattern by the use of a mask overlaying the sheet material on one side thereof. A mask is made of a thin material that is reflective of the coherent light energy utilized and will withstand the energy of a focused coherent light beam. The mask contains holes therein the size of the holes desired to be punched in the sheet material. A coherent light beam is focused to a size slightly larger, perhaps about three times as large, as the holes in the mask. The coherent light beam is then scanned in a pattern to cover all of the holes of the mask. The light beam being of larger cross-section than the size of the holes reduces the possibility that any minor misalignment will cause insufficient energy to pass through one of the holes.

The sheet material is supported by a supporting plate on its opposite side to that side contacted by the mask. The supporting plate is of a gauge material heavy enough not to bend. The sheet material to be punched with holes is tightly sandwiched between the mask and support plate. This assures very close contact between the sheet material and the mask. The support plate preferably has holes therein with a pattern matching the holes of the mask and aligned therewith. The holes of the support plate may be slightly larger in diameter than the holes of the mask. The holes of the support plate are very important when the sheet material is green ceramic or a similar type material and a coaxial gas jet is used. The holes in the support plate than allow the particulate material to be blown away from the sheet material by the gas stream.

According to yet another aspect of the present invention, holes are constructed having a diameter many times greater than that diameter of the laser beam used. This is accomplished by scanning the laser beam with or without a gas jet, depending on the particular sheet material utilized, in a closed loop path to cut free a portion of the sheet material from the remaining sheet material.

Additional objects and advantages of the various aspects of the present invention will become apparent in the following description of preferred embodiments taken in conjunction with the drawings.

DESCRIPTION OF THE PREFERRED EMBODIMENTS

Figure 1:
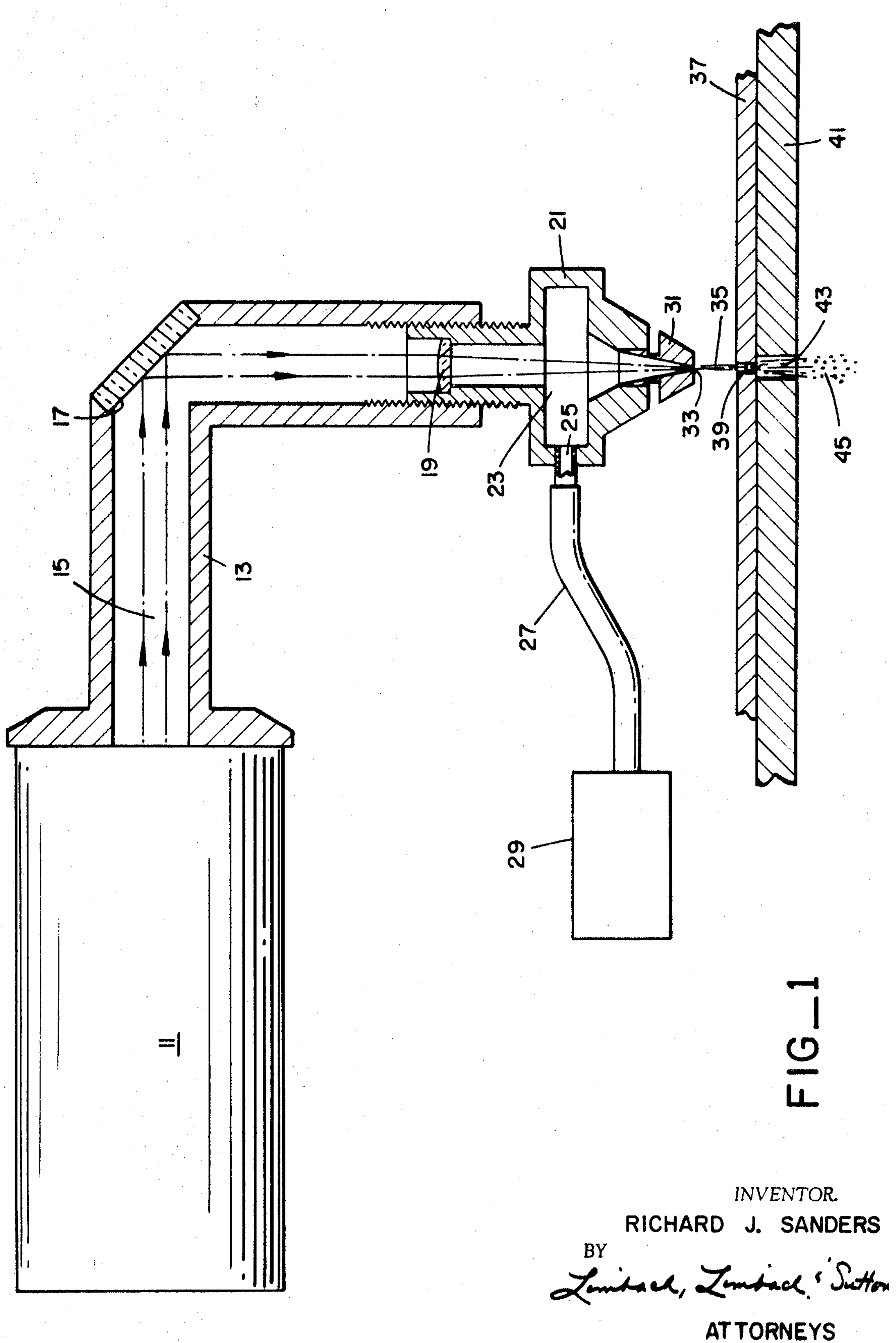
FIG. 1 shows an apparatus for coaxially combining a coherent light beam and a gas jet.

FIG. 1 shows one arrangement for generating a coaxial coherent light beam and gas stream. A laser 11 is attached to a tubular frame 13 that is supported against gravity by some convenient means not shown. The laser 11 can be any convenient type, such as a $CO_2$ laser which emits coherent light radiation in the far infrared region and having a wavelength output of 10.6 microns.

A coherent light beam 15 emitted by the laser 11 is reflected by a mirror 17 provided in a right angle bend of the tubular frame 13. The mirror 17 directs the coherent light beam 15 to a lens 19 that is firmly held by a mounting element 21. The mounting element 21 fits into the end of the tubular frame 13 furthest removed from the laser 11. The purpose of the lens 19 primarily is to focus the laser beam 15 to a small controlled area light beam at the surface of a material to be punched. The mounting element 21 is slidable with respect to the frame 13 as a means of controlling the area of the beam incident upon a sheet of material. The lens 19 is preferably constructed of a germanium material or of galium arsinide.

The lens 19 serves an additional function of closing off a gas pressure chamber 23 within the mounting element 21. The pressure chamber 23 has an input orifice 25 through which gas is supplied with a pressure greater than the outside atmospheric pressure through connection 27 from a source of gas 29. The gas source 29 may be a compressed air pump, and this is desirable in most applications. Alternatively, the source of gas 29 may be bottled oxygen, nitrogen, argon or some other suitable gas. It may be desirable in some circumstances to maintain a gas pressure within the chamber 23 as high as 60 pounds per square inch.

The bottom of the mounting element 21 is provided with a nozzle 31 having a small opening 33 at its end through which the focused light beam 15 and a stream of gas from the chamber 23 pass coaxially therethrough. The nozzle 31 is preferably adjustable with respect to the mounting element 21 so that the distance of the nozzle from the sheet material may be adjusted and so that it may be centered around the focused coherent light beam 15.

A coaxial light beam and air pressure stream 35 is directed against a sheet material 37 to form a hole 39 therethrough. The sheet material 37 is desirably held in most circumstances by a rigid support plate 41 on its side opposite to that side on which the light and air stream coaxial beam 35 is incident. For certain types of sheet material 37, an aperture 43 is desirably provided directly underneath the region of the sheet material 37 through which the hole is being punched to allow any particulate material 45 to be expelled therethrough by the gas stream.

The opening 33 of the nozzle 31 is made large enough so that the gas stream in the coaxial beam 35 has a diameter that is larger than the hole that is being formed in the sheet material 37. This aids in cooling the sheet material 37 in areas adjoining the holes being formed.

Use of the coaxial coherent light and air stream is particularly advantageous when the sheet material 37 is a non-homogeneous type of material. Such a non-homogeneous material is characterized by a large number of finely divided particles that are held together by a binder material. If the binder material vaporizes at a temperature lower than that at which the particulate material vaporizes, the laser beam may be reduced in energy from that required to vaporize all the sheet material so long as the energy level is sufficient to vaporize the binding material. The air stream portion of the coaxial beam physically displaces the loosened particles. Green ceramic sheet material is a specific form of this type of non-homogeneous material where this technique is especially valuable in forming very small and clean holes therethrough.

In the construction of miniature electronic modules with green ceramic, as discussed above, and in other applications with other sheet materials, it is often desirable to punch a plurality of holes in a given single sheet of material. The holes generally must be in predetermined locations within very close tolerances. This can be done with the apparatus shown in FIG. 1 by operating the $CO_2$ laser 11 in its pulsed mode and by indexing the sheet material 37 with respect to the nozzle 31 between the pulses of the laser 11. Although this may be preferred in certain circumstances, it does have the disadvantage of being slow when a plurality of holes must be formed with great precision. The use of a mask overlaying the sheet material in which the holes are being formed is a faster technique since the laser beam can be scanned across the holes of the mask without having to stop for each hole and be accurately aligned in the desired position of the hole.

Figures 2, 3, 4, 5:
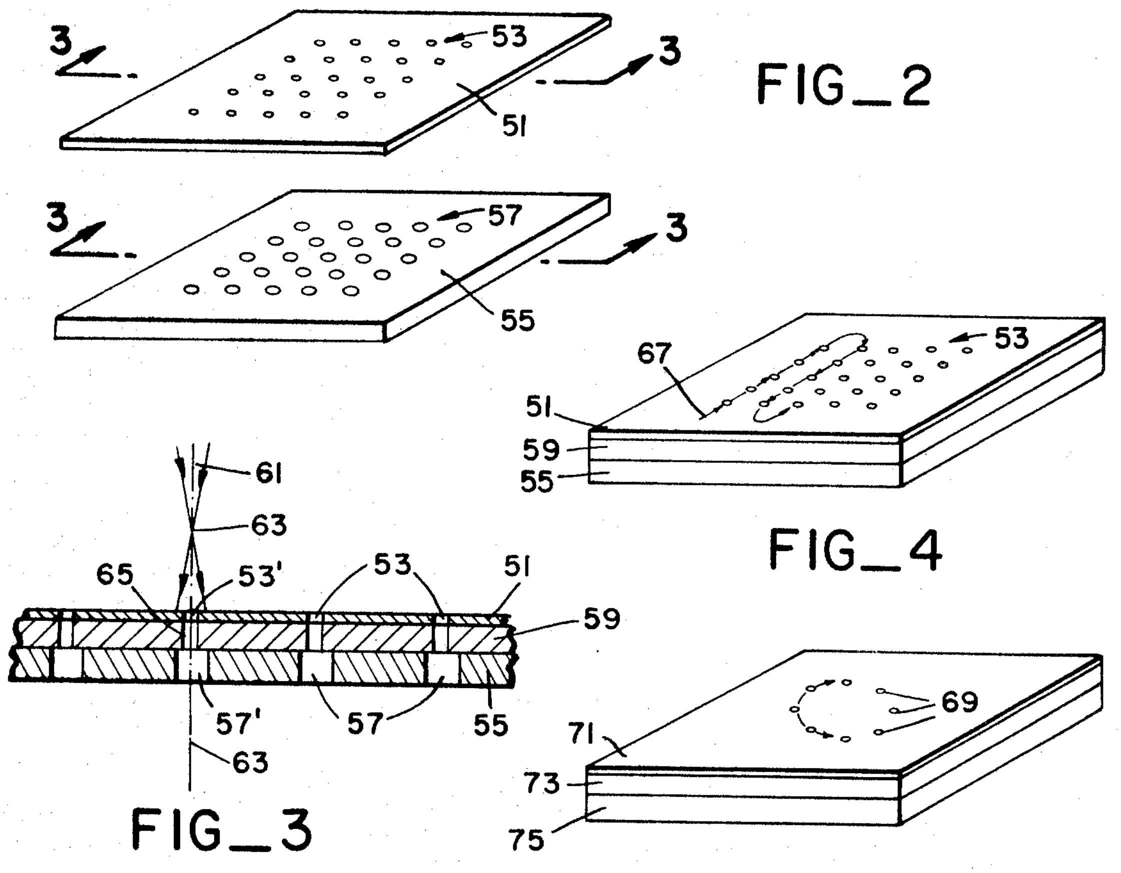
FIG. 2 shows a typical mask and support plate for holding a sheet material.
FIG. 3 shows the mask and support plate of FIG. 2 sandwiched against a sheet material that is being punctured with holes.
FIG. 4 shows one path of scanning a laser beam across a mask.
FIG. 5 shows another path of scanning a laser beam across a mask.

FIG. 2 shows a mask 51 having a plurality of holes 53 therethrough in the pattern desired to be placed in the sheet material. The mask can be made from any material that will reflect coherent light energy at the particular wavelength used and which will withstand the focused beam energy without disintegrating. Typical materials are stainless steel, brass, aluminum and copper. The mask 51 is generally made from a thin material of about 0.006 inch or less depending on how small the holes 53 must be. For instance, if the holes 53, which correspond to the size of the holes to be placed in the sheet material are each 0.005 inch in diameter, the thickest that the mask 51 can be is about 0.004 inch. As the size of the holes 53 increase, the permissible thickness of the mask 51 increases. Another possibility is to make the mask 51 from a thicker material than would ordinarily be desirable and then countersink the top edge of the mask around each hole to reduce the thickness of the mask to the desired amount around each hole.

The mask 51 is designed to overlay one side of the sheet material being punched with holes. For materials that are not very rigid, such as green ceramic, a support plate 55 is desired for contacting the opposite side of the sheet material and holding it rigid. With green ceramic and other similar non-homogeneous materials, a plurality of holes 57 must be provided in the support plate 55 in the same pattern as the holes 53 of the mask 51 in order to carry out the technique described above with respect to FIG. 1. The holes 57 allow the particulate material of the green ceramic to be blown through its side opposite the side irradiated with laser energy. The holes 57 are preferably slightly larger than the corresponding holes 53 of the mask 51. The support plate 55 assures intimate contact between the mask 51 and the sheet material sandwiched therebetween during the drilling operation. Since this intimate contact is quite important for obtaining quality drilled holes in the material, the support plate 55 is made of a rigid material, something in the order of 0.020 inch thick. Green ceramic sandwiched between the support plate 55 and the mask 51 is typically about 0.007 inch thick for electronic module applications.

FIG. 3 shows cross-sectional views of the mask 51 and the support plate 55 of FIG. 2 with a sheet material 59 sandwiched therebetween during a drilling operation of the material 59. It will be noted that the holes 53 of the top mask and the holes 57 of the bottom support plate are aligned with each other to be along the path of the irradiating laser beam.

Consider for instance a laser beam 61 that is brought to a point focus 63 and then allowed to defocus into a larger beam for striking the mask 51. The focus of the laser beam 61 is controlled so that the area of the beam when striking a particular hole 53' is larger than the area of that hole, preferably with a diameter of about three times the hole diameter. The particular mask hole 53' and a particular support plate hole 57' are aligned with each other along a center line 63 of the laser beam 61. The result of a proper exposure of the sheet material 59 to the laser beam 61 is a hole 65 drilled therethrough that is no bigger than the hole 53' of the mask 51 and one that is aligned along the axis 63 of the coherent light beam 61. If the sheet material 59 is green ceramic or a material having similar non-homogeneous characteristics, then an air stream is provided coaxially with the coherent light beam 61 in carrying out the improved technique described hereinabove with respect to FIG. 1.

FIG. 4 shows sheet material sandwiched between the mask and the support plate in a view that shows how the laser beam 61 of FIG. 3 is scanned over the holes 53 of the mask 51. The laser beam can be scanned in any number of ways, a path 67 being indicated in FIG. 4 wherein each row of holes 53 is illuminated by scanning the beam along one row and the other in sequence. Any convenient mechanical system may be utilized for providing such relative motion between the laser beam and the mask 51. The laser beam itself could be caused to move while the mask 51, support plate 55 and sheet material 59 are held fixed. Another possibility is to move the laser beam in one direction while the material and mask move in a direction orthogonal thereto. As a third alternative, but probably the least desirable in most applications, the sandwiched mask 51, support plate 55 and sheet material 59 could be moved both in the *x* and *y* direction while the laser beam remains stationary. It is also possible for high volume production to use long rolls of sheet material 59 in contact with a long roll of a repetitive mask 51 for drawing a continuous strip past the laser source equipment.

No matter what particular mechanical scanning scheme between the laser beam and the mask 51 is utilized, the speed of travel over the holes 53 is dependent upon the energy density of the laser beam incident on each hole and the type of material 59 that is being drilled. In the application of the mask technique for drilling green ceramic sheet material, a coaxial gas stream is also scanned along with the coherent light. The speed of movement of the coaxial beam relative to the ceramic is such to expose the area of ceramic under each hole only for enough time to vaporize the binding material but not for such a long period of time to vaporize all of the loosened particles.

The holes in the mask overlaying the sheet material to be drilled do not, of course, have to be in symmetrical rows. A complicated unsymmetrical pattern of mask holes will, of course, complicate the matter of scanning the laser beam over all of the holes.

Another particular pattern that is useful in many applications is a plurality of holes in a circular path, such as the holes 69 in a mask 71 of FIG. 5. The mask 71, as before, overlays a sheet material 73 which is preferably supported by a rigid support plate 75. Holes in the pattern of the holes 69 may be drilled in a sheet material 73 by scanning a laser beam in a circle over the holes as shown by the arrow of FIG. 5.

Figure 6:
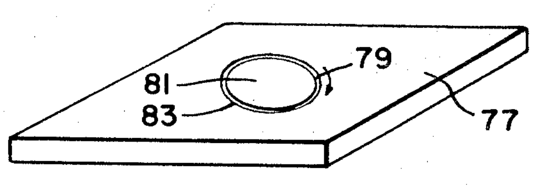
FIG. 6 indicates the scanning path of a laser beam for cutting out a hole larger than that of the laser beam.

In the embodiments discussed hereinabove, holes have been drilled in the material by exposing the entire area of material to be removed to the coherent light beam. This limits the size of the hole that can be drilled. As the coherent light beam is expanded to cover a larger area for drilling a larger hole, the energy density of the coherent light beam decreases. At some point, the energy density will not be sufficient for forming a hole of a desired larger diameter in a reasonable length of time, or perhaps at all. Referring to FIG. 6, a technique is shown for drilling large diameter holes, up to one-half inch in diameter and more, in a sheet material 77. A high energy density laser beam, not shown in FIG. 6, is scanned in the direction shown to remove material in a circle 79. A core 81 of the sheet material 77 in the middle of the circle 79 is then removed to form a hole having an outside diameter at the outside 83 of the circular channel 79.

Figure 7:
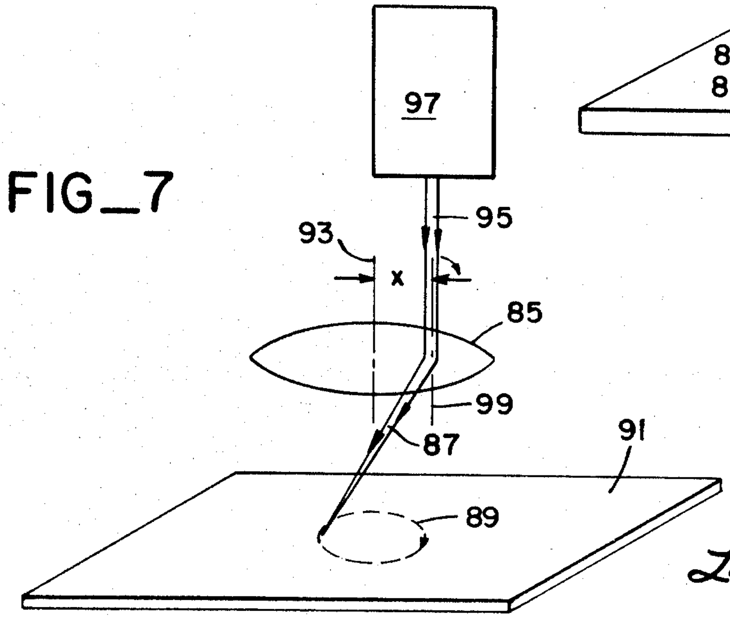
FIG. 7 shows schematically an apparatus for scanning a laser beam in a circle.

There are a number of different techniques which will become apparent for scanning a laser beam in a circle to implement the hole drilling operations described with respect to FIGS. 5 and 6. A preferred technique, however, is shown in FIG. 7 which utilizes a rotating lens 85 for scanning a focused laser beam 87 in a circular path 89 on a sheet material 91. The lens 85 has an optical axis 93 about which the lens is symmetrical. A coherent light beam 95 derived from a laser light source 97 is directed against lens 85 a distance *x* from the optical axis 93. The lens 85 is rotated about an axis 99 that is coincident with the light beam 95. As the lens 85 is so rotated, the focused laser beam 87 is caused to rotate. The diameter of the path 89 scanned out by the focused light beam 87 is controlled by the distance *x* between the optical axis 93 of the lens 85 and the axis 99 of rotation. The rotating lens technique of FIG. 7 does not form part of the present invention but rather was disclosed to the applicant herein by Jim Hobart and Wayne Mefferd.

The present invention has been described in detail in terms of its preferred embodiments, but it is understood that this does not limit the scope of the appended claims.

What is claimed is:

1. A method of forming a plurality of holes in a thin sheet material, comprising the steps of:

positioning a mask over one side of said sheet material, said mask being constructed of a material that is more resistant to vaporization by coherent light energy than is said sheet material, said mask additionally having a plurality of holes therethrough with a size and position corresponding to the desired plurality of holes to be placed in said sheet material, positioning a rigid supporting plate on the other side of said sheet material, said supporting plate having a plurality of holes therethrough aligned with said plurality of holes of the mask and of a size at least as great, holding said mask, said sheet material and said supporting plate firmly together without obstructing the holes of either the supporting plate or the mask, directing a beam of coherent light energy against said mask, said light beam having a cross-sectional area larger than the holes of said mask, and providing relative scanning motion between said coherent light beam and said mask in a manner that said light beam impinges upon the areas of said sheet material exposed through holes of said mask, an energy density of said light beam and a speed of said scanning motion being sufficient to form holes in said sheet material under the holes of said mask.

2. A method of forming a plurality of holes in a thin sheet material, comprising the steps of:

positioning a mask over one side of said sheet material, said mask being constructed of a material that is more resistant to vaporization by coherent light energy than is said sheet material, said mask additionally having a plurality of holes therethrough with a size and position corresponding to the desired plurality of holes to be placed in said sheet material, positioning a rigid supporting plate on the other side of said sheet material, said supporting plate having a plurality of holes therethrough aligned with said plurality of holes of the mask and of a size at least as great, holding said mask, said sheet material and said supporting plate firmly together without obstructing the holes of either the supporting plate or the mask, directing a coaxially aligned beam of coherent light energy and a gas stream against said mask, said light beam and said gas stream having cross-sectional areas larger than the holes of said mask, and providing relative scanning motion between said coaxial beam and said mask to impinge said coaxial beam upon the areas of said sheet material exposed through holes of said mask, an energy density of said light beam, the force of said gas stream and a speed of scanning across the mask being sufficient to form holes in said sheet material under the holes of said mask.

3. The method according to claim 2 wherein said sheet material is an unbaked ceramic material.

4. A method of forming a plurality of holes in a sheet material that is composed of finely ground particles held together by a binding material, comprising the steps of:

positioning a mask over one side of said sheet material, said mask being constructed of a material that is more resistant to vaporization by coherent light energy than is said sheet material, said mask additionally having holes therethrough with a size and position corresponding to the desired plurality of holes to be placed in said sheet material, positioning a rigid supporting plate on the other side of said sheet material, said supporting plate having a plurality of holes therethrough aligned with said plurality of holes of the mask and of a size at least as great, holding said mask, said sheet material and said supporting plate firmly together without obstructing the holes of either of the supporting plate or the mask, directing a coaxially aligned beam of coherent light energy and a gas stream against said mask, said light beam and said gas stream having cross-sectional areas larger than the holes of said mask, and providing relative scanning motion between said coaxial beam and the mask in a manner to sequentially expose the areas of said sheet material aligned with holes in the mask for a time sufficient to vaporize the binding material through the sheet material in each of said exposed areas but for a time that is insufficient to vaporize all the particulate material through the sheet in each of said exposed areas.

5. The method as defined by claim 4 wherein said sheet material is an unbaked ceramic material.

6. A method of forming a plurality of holes in sheet material, comprising the steps of:

holding a mask against one side of said sheet material without relative movement therebetween, said mask being constructed of a material that is more resistant to vaporization by coherent light energy than is said sheet material, said mask additionally having a plurality of holes therethrough with a size and position corresponding to the desired plurality of holes to be placed in said sheet material, directing a beam of coherent light energy against said mask, said light beam having a cross-sectional area larger than the holes of said mask but smaller than a distance between holes thereof, and providing relative scanning motion between said coherent light beam and said mask in a manner that said light beam impinges upon the areas of said sheet material exposed through holes of said mask, an energy density of said light beam and a speed of said scanning motion being sufficient to form holes in said sheet material under the holes of said mask.

7. The method of claim 6 wherein said mask includes its said holes in a pattern of adjacent rows, and further wherein the step of providing relative scanning motion includes scanning said light beam down each row of holes one at a time until all holes in said pattern are exposed.

8. The method of claim 6 wherein said mask includes its said holes in a substantially circular pattern and further wherein the step of providing relative scanning motion includes scanning said light beam in said substantially circular pattern to expose all the holes of said pattern.

* * * * *

UNITED STATES PATENT AND TRADEMARK OFFICE

CERTIFICATE OF CORRECTION

PATENT NO. : 3,742,182

DATED : 26 June 1973

INVENTOR(S) : Richard J. Saunders

It is certified that error appears in the above-identified patent and that said Letters Patent are hereby corrected as shown below:

Please change the title of the patent from "METHOD FOR SCANNING MASK FORMING HOLER WITH A LASER BEAM" to read "METHOD FOR SCANNING MASK FORMING HOLES WITH A LASER BEAM".

Signed and Sealed this

*Twenty-first* Day of *November 1978*

[SEAL]

*Attest:*

RUTH C. MASON
*Attesting Officer*

DONALD W. BANNER
*Commissioner of Patents and Trademarks*